United States Patent
Harris

(10) Patent No.: US 7,017,934 B2
(45) Date of Patent: Mar. 28, 2006

(54) TRACTOR DOLLY

(76) Inventor: Dennis E. Harris, 5708 Davis Mill Rd., Greensboro, NC (US) 27406

( * ) Notice: Subject to any disclaimer, the term of this patent is extended or adjusted under 35 U.S.C. 154(b) by 0 days.

(21) Appl. No.: 10/763,064

(22) Filed: Jan. 22, 2004

(65) Prior Publication Data

US 2005/0161903 A1   Jul. 28, 2005

(51) Int. Cl.
*B62D 1/00* (2006.01)

(52) U.S. Cl. .................... 280/476.1; 280/438.1

(58) Field of Classification Search ............ 280/476.1, 280/425.1, 438.1, 441, 478.1, 479.1, 481; 414/563

See application file for complete search history.

(56) References Cited

U.S. PATENT DOCUMENTS

| | | | |
|---|---|---|---|
| 2,937,772 A | | 5/1960 | Sullivan |
| 3,679,233 A | * | 7/1972 | Baker et al. ............. 280/476.1 |
| 3,779,407 A | | 12/1973 | Gillem |
| 4,152,006 A | | 5/1979 | Dunlap |
| 4,589,670 A | * | 5/1986 | Sweetin .................... 280/405.1 |
| 4,618,161 A | | 10/1986 | McNeill |
| 4,743,158 A | | 5/1988 | Hodges |
| 4,759,563 A | * | 7/1988 | Nash ........................ 280/476.1 |
| 4,759,683 A | | 7/1988 | Hodges |
| 5,067,741 A | * | 11/1991 | Ayme ........................ 280/419 |
| 5,215,425 A | | 6/1993 | Hambright |
| 5,326,215 A | | 7/1994 | Eberhardt |
| 5,531,468 A | * | 7/1996 | White ........................ 280/463 |
| 5,749,593 A | | 5/1998 | Phillips et al. |
| 5,860,670 A | * | 1/1999 | Aubin ...................... 280/476.1 |
| 6,033,177 A | | 3/2000 | Kooima |
| 6,290,248 B1 | * | 9/2001 | Yrigoyen ................. 280/476.1 |
| 6,663,131 B1 | * | 12/2003 | Evans ....................... 280/476.1 |

FOREIGN PATENT DOCUMENTS

DE      102 17 155      10/2003

OTHER PUBLICATIONS

International Search Report mailed Apr. 21, 2005 in connection with PCT/US2004/043781.

Written Opinion of the International Searching Authority mailed on Apr. 21, 2005 in connection with PCT/US2004/043781.

* cited by examiner

*Primary Examiner*—Tony Winner
(74) *Attorney, Agent, or Firm*—Smith Moore LLP

(57) ABSTRACT

A portable dolly for use in towing a tractor including at least one wheel for moving the dolly, a king pin configured for placement in a mating engagement with a fifth wheel on the tractor, and a plurality of chains for connecting the dolly to the tractor, wherein the dolly is configured to assist a wrecker with towing the tractor from the tractor's front end without removing the front drive axle and drive shaft on the tractor. A lift mechanism is provided for lifting the tractor off the ground into a position that is suitable for towing.

10 Claims, 4 Drawing Sheets

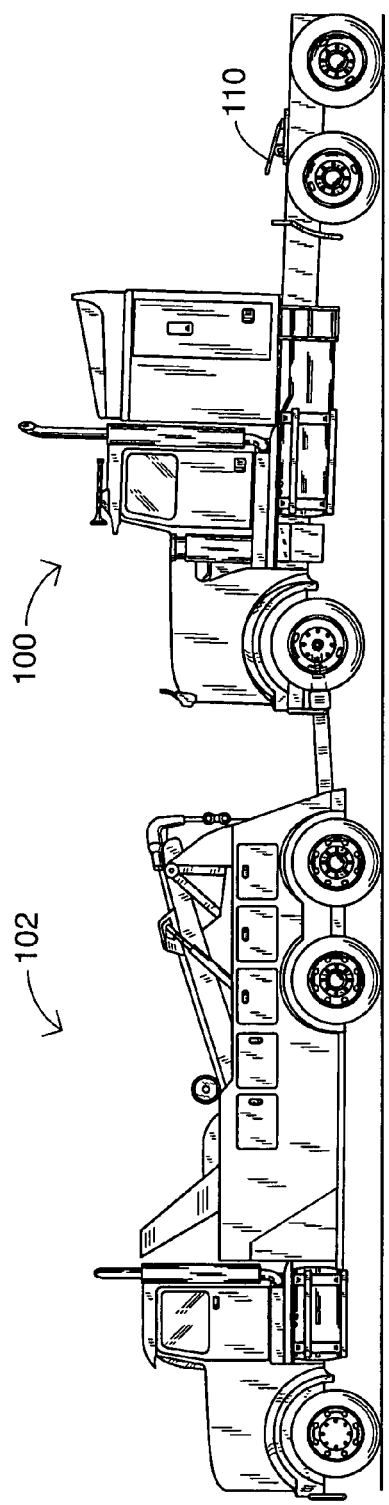
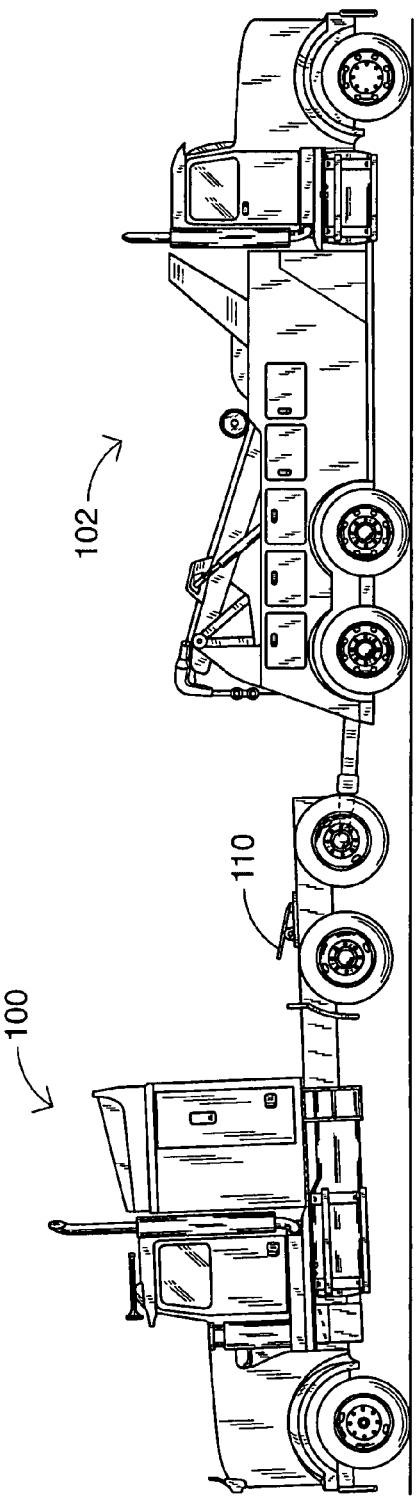
FIG. 2
FIG. 3

TRACTOR DOLLY

BACKGROUND OF THE INVENTION

The present invention relates to tractor dollies, and more particularly, to a dolly for towing a tractor.

A typical two or four axle tractor rig is shown in FIG. 1 and identified by 100. It is common place to tow such a tractor 100 to a given destination whenever the tractor 100 becomes inoperative or damaged. There are several prior art methods for towing such tractors 100. A first method involves towing the tractor 100 from the front of the tractor 100 so that it faces the same direction as the tow truck or wrecker 102, as shown in FIG. 2. This type of towing method must be used when there is a problem with the inoperative tractor's 100 front axle. When using this method, the attendant must remove the drive shaft of the tractor 100 and then chain the front axle of the tractor 100 to the tow truck 102. If the drive shaft is not removed, the transmission will continue to spin while the tractor 100 is being towed, thereby causing the transmission to potentially burn out. One of the disadvantages of this towing method is that the brake lights on the back of the inoperative tractor 100 are disabled so it is difficult for vehicles behind the tow truck 102 to see when the brakes are being applied. This can be very dangerous on the roadway. Another drawback is that when the drive shaft is removed, the needle bearings often get lost, which can be burdensome and expensive to replace.

In a second prior art method for towing tractors, the tractor 100 is towed such that it faces away from the tow truck 102, as shown in FIG. 3. This type of towing method may be used when the disabled tractor 100 is experiencing problems with its motor, transmission, or rear axle. The tow truck 102 is connected to the rear axle of the tractor 100. However, in order for the tow truck 102 to position itself to connect to the tractor 100, the tow truck 102 must line up behind the inoperative tractor 100 so that it can pull the tractor 100 backwards. This can be difficult and dangerous when the inoperative tractor 100 is parked on the side of a busy road or highway with a narrow shoulder. This is especially true when after connecting to the inoperative tractor 100, the tow truck 102 must turn around in the road with the inoperative tractor 100 to begin traveling in the correct direction.

Accordingly, there is a need in the art for an improved method for towing tractors that is both efficient and safe.

SUMMARY OF THE INVENTION

A portable dolly for use in towing a tractor including at least one wheel for moving the dolly, a king pin configured for placement in a mating engagement with a fifth wheel on the tractor, and a plurality of chains for connecting the dolly to the tractor, wherein the dolly is configured to assist a wrecker with towing the tractor from the tractor's front end without removing the front drive axle and drive shaft on the tractor.

The dolly also preferably includes a drop leg having a caster for rolling the dolly and may be electrically or battery powered for rolling the dolly into a position to be joined to the tractor. The chains on the dolly are preferably adapted for connection to the rear drive axle of the tractor. Light and air cords are also provided on the dolly and are configured for connection to the wrecker.

An inflatable air bag or hydraulic lift is provided on the dolly for lifting the tractor to a position suitable for towing.

The dolly also includes a light bar that is powered by the wrecker's power source and provides signal lights, hazard lights, and brake lights for the dolly. Brakes are also included on the dolly, which are configured for connection to the wrecker.

The present invention also provides a portable dolly for use in towing a tractor including at least one wheel for moving the dolly, a king pin configured for placement in a mating engagement with a fifth wheel on the tractor, and a lift mechanism for lifting the tractor off the ground into a position suitable for towing, wherein the dolly is configured to assist a wrecker with towing the tractor from the tractor's front end without removing the front drive axle and drive shaft on the tractor.

BRIEF DESCRIPTION OF THE DRAWINGS

The present invention is better understood by a reading of the Detailed Description of the Preferred Embodiments along with a review of the drawings, in which:

FIG. 2 is a view of tractor that is towed from the front in accordance with a first prior art method.

FIG. 3 is a view of tractor that is towed from the back in accordance with a second prior art method.

DETAILED DESCRIPTION OF THE PREFERRED EMBODIMENTS

The illustrations and examples discussed in the following description are provided for the purpose of describing the preferred embodiments of the invention and are not intended to limit the invention thereto.

Figure 1:
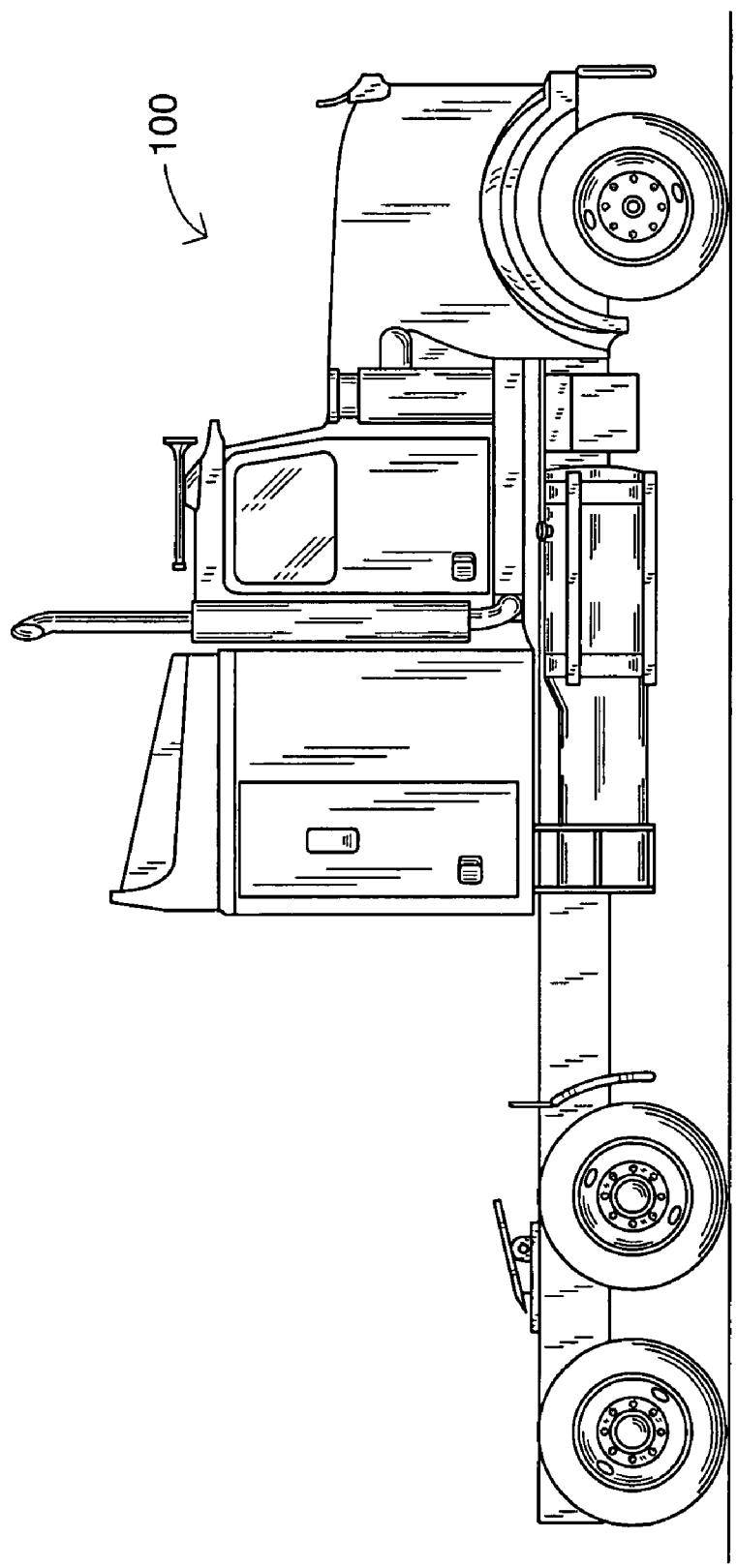
FIG. 1 is a view of a typical tractor.
Figure 4:
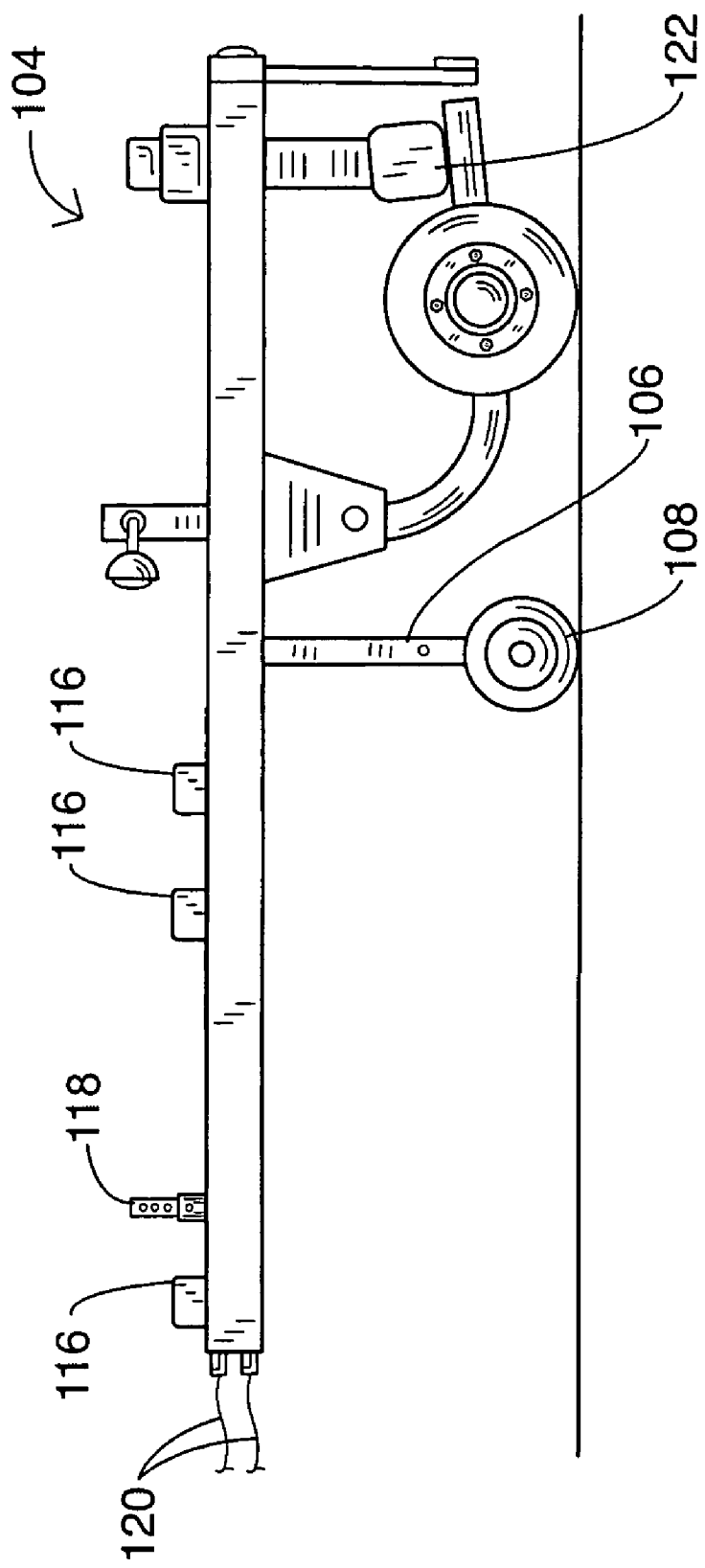
FIG. 4 is a view of a dolly for towing tractors in accordance with the present invention.
Figure 5:
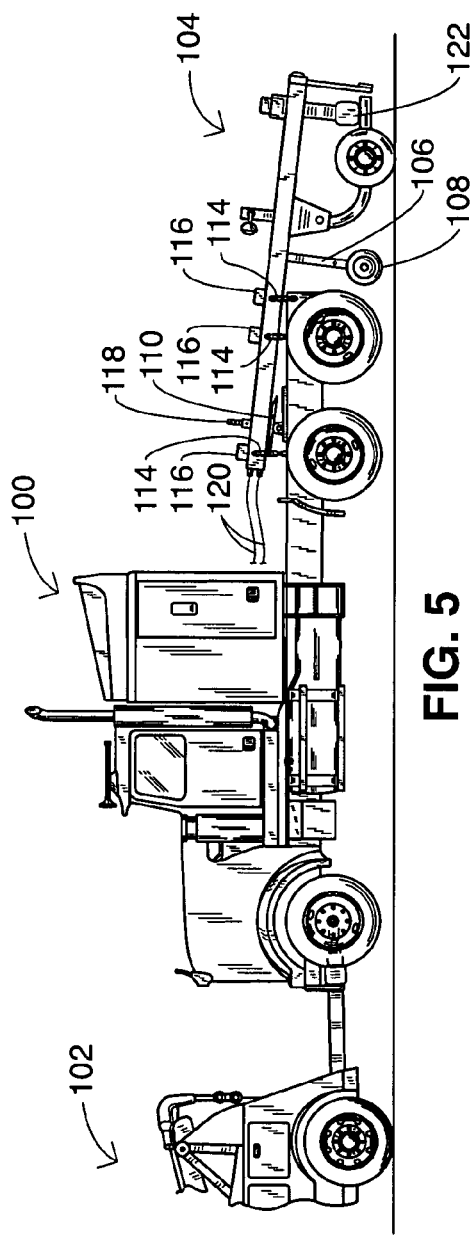
FIG. 5 is a view of the dolly joined to a tractor in accordance with the present invention.

As shown in FIGS. 4 and 5, the present invention provides a self-contained dolly 104 for assisting a tow truck 102 with towing a tractor 100. The dolly 104 is preferably carried by the tow truck 102 to the location of the tractor 100. Once the tow truck 102 arrives at the destination, the attendant pushes the dolly 104 to the rear of the tractor 100. A drop leg 106 with a wheel 108 helps the dolly 104 to roll. In a preferred embodiment, the dolly 104 may be electrically or battery 124 powered and directed to move to the appropriate location.

The dolly 104 is then hooked onto the fifth wheel 110 of the tractor 100. In particular, the dolly 104 includes a king pin 118 that is known in the art for fitting into a mating engagement with the fifth wheel 110 on the tractor 100. The attendant then chains the dolly 104 to the tractor 100. The dolly 104 includes multiple areas for storing all of the chains 114 necessary for connecting the tractor 100 to the dolly 104. These chains 114 are purposefully located in the most convenient positions on the dolly 104, any may be stored in chain boxes 116. Thus, the attendant easily chains the dolly 104 to the rear drive axles of the tractor 100. The back of the tractor 100 is also preferably connected to the dolly 104 with a chain 114. Light cords and air cords (collectively 120) are provided on the dolly 104, which are connected to the tow truck 102 by the attendant, as discussed further below. Therefore, the attendant does not have to pull any chains, lights, or cords, from the wrecker 102. Rather, all of the components are already located on the dolly 104.

After all of the proper chains, cords, and hoses have been connected, the attendant activates an inflatable air bag and/or hydraulic lift 122 on the dolly 104 which lifts the tractor 100 by at least about six inches. At this point, the tractor 100 is ready to be towed.

The self contained dolly 104 of the present invention provides many advantages over the prior art. First, this method does not require removing the axles and drive shafts of the tractor 100, which can be dangerous and burdensome if parts are lost during the process. Particularly, the attendant does not have to get under the tractor 100 to pull the drive shaft or back off the brakes where there is a risk of falling debris and tools.

Also, towing the tractor 100 from the front provides certain advantages. Namely, the tow truck 102 does not have to turn the tractor 100 around in the middle of the roadway, which can be very dangerous and the tow truck 102 gets better fuel mileage because there is less wind resistance.

Figure 6:
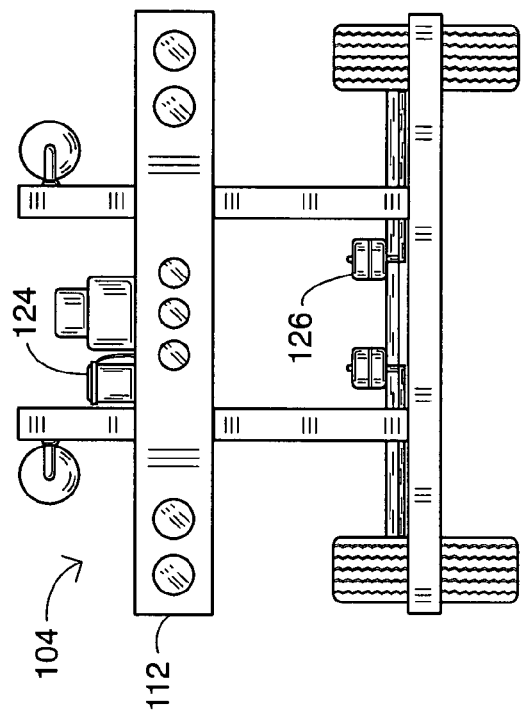
FIG. 6 is a rear view of the dolly in accordance with the present invention.

As shown in FIG. 6, the back of the dolly 104 preferably includes a light bar 112 that provides signal, brake, and warning lights. The lights are powered by the tow truck's 102 power source via the light cords 120 on the dolly 104 that are connected to the tow truck 102. The light bar 112 is preferably designed in accordance with Department of Transportation (DOT) standards. Therefore, the tractor 100 and tow truck 102 are more visible to other vehicles on the roadway.

An additional advantage of the dolly 104 of the present invention is that it may be equipped with brakes 126 that may be connected to the tow truck 102. Therefore, when the tow truck 102 applies its brakes 126, the dolly 104 is also slowed, which results in a shorter stopping distance.

Certain modifications and improvements will occur to those skilled in the art upon a reading of the foregoing description. All such modifications and improvements of the present invention have been deleted herein for the sake of conciseness and readability but are properly within the scope of the following claims.

What is claimed is:

1. A portable dolly for use in towing a tractor comprising:
   at least one wheel for moving the dolly;
   a king pin configured for placement in a mating engagement with a fifth wheel on the tractor; and
   a plurality of chains for connecting the dolly to the tractor;
   wherein the dolly is configured to assist a wrecker with towing the tractor from the tractor's front end without removing the front drive axle and drive shaft on the tractor.

2. The dolly of claim 1 wherein the dolly further comprises a drop leg having a caster for rolling the dolly.

3. The dolly of claim 1 wherein the dolly is electrically or battery powered for rolling the dolly.

4. The dolly of claim 1 wherein the chains are adapted for connection to the rear drive axle of the tractor.

5. The dolly of claim 1 further comprising a plurality of light cords and air cords that are configured for connection to the wrecker.

6. The dolly of claim 1 further comprising an inflatable air bag for lifting the tractor to a position suitable for towing.

7. The dolly of claim 1 further comprising a hydraulic lift for lifting the tractor to a position suitable for towing.

8. The dolly of claim 1 further comprising a light bar that provides signal lights, hazard lights, and brake lights, the light bar being powered by the wrecker's power source.

9. A portable dolly for use in towing a tractor comprising:
   at least one wheel for moving the dolly;
   a king pin configured for placement in a mating engagement with a fifth wheel on the tractor; and
   a lift mechanism for lifting the tractor off the ground into a position suitable for towing;
   wherein the dolly is configured to assist a wrecker with towing the tractor from the tractor's front end without removing the front drive axle and drive shaft on the tractor.

10. The dolly of claim 9 further comprising brakes for stopping the dolly, the brakes being configured for connection to the wrecker.

* * * * *